(12) United States Patent
Demetropoulos

(10) Patent No.: US 8,032,944 B2
(45) Date of Patent: Oct. 11, 2011

(54) HYPOALLERGENIC WETSUIT AND MATERIAL

(76) Inventor: Carl Lee Demetropoulos, Thousand Oaks, CA (US)

( * ) Notice: Subject to any disclaimer, the term of this patent is extended or adjusted under 35 U.S.C. 154(b) by 0 days.

(21) Appl. No.: 12/393,208

(22) Filed: Feb. 26, 2009

(65) Prior Publication Data

US 2009/0210987 A1  Aug. 27, 2009

Related U.S. Application Data

(60) Provisional application No. 61/031,676, filed on Feb. 26, 2008.

(51) Int. Cl.
*B63C 11/04* (2006.01)
*B63C 11/02* (2006.01)

(52) U.S. Cl. .................. 2/2.16; 2/2.15; 2/2.17
(58) Field of Classification Search ............ 2/2.15, 2/2.16
See application file for complete search history.

(56) References Cited

U.S. PATENT DOCUMENTS

| | | | |
|---|---|---|---|
| 5,622,762 A | 4/1997 | Perla | |
| 5,834,123 A | 11/1998 | Laurich et al. | |
| 6,228,804 B1 * | 5/2001 | Nakashima | 503/226 |
| 6,319,599 B1 | 11/2001 | Buckley | |
| 6,602,102 B2 | 8/2003 | Gines et al. | |
| 6,855,410 B2 | 2/2005 | Buckley | |
| 7,051,375 B2 | 5/2006 | Polak et al. | |
| 7,073,201 B2 * | 7/2006 | Sunada et al. | 2/2.15 |
| 2002/0037381 A1 * | 3/2002 | Ohira et al. | 428/36.9 |
| 2002/0164473 A1 | 11/2002 | Buckley | |
| 2003/0157853 A1 * | 8/2003 | Huber | 442/76 |
| 2003/0182704 A1 * | 10/2003 | Sunada et al. | 2/2.15 |
| 2007/0012397 A1 * | 1/2007 | de Jong | 156/252 |
| 2007/0266473 A1 * | 11/2007 | Issel | 2/84 |
| 2009/0027873 A1 * | 1/2009 | Tarlton | 362/84 |

OTHER PUBLICATIONS

Material Safety Data Sheet, DuPont KEVLAR® Brand Fiber;MSDS No. SP1889, Revision Date: Nov. 19, 1999.*

* cited by examiner

*Primary Examiner* — Bobby Muromoto, Jr.
(74) *Attorney, Agent, or Firm* — Patent Technologies, LLC; Robert D. Gunderman, Jr.

(57) ABSTRACT

A hypoallergenic wetsuit and material is described that uses closed cell acrylonitrile butadiene rubber. Polyvinyl chloride (PVC) may also be blended with the acrylonitrile butadiene rubber. The density of the closed cell acrylonitrile butadiene rubber may vary depending on the hypoallergenic wetsuit application. Low densities such as less than 70 kg./m³, and preferably 50 to 61 Kg./m³, are desirable in many applications.

18 Claims, 11 Drawing Sheets

HYPOALLERGENIC WETSUIT AND MATERIAL

CROSS REFERENCE TO RELATED PATENT APPLICATIONS

This application claims priority to U.S. Patent Application Ser. No. 61/031,676 filed Feb. 26, 2008 entitled "Hypoallergenic Wetsuit" by Dr. Carl Lee Demetropoulos of Thousand Oaks, Calif.

BACKGROUND OF THE INVENTION

1. Field of the Invention

This invention relates generally to apparel, and more specifically to a hypoallergenic wetsuit and hypoallergenic material.

2. Description of Related Art

Wetsuits are used by SCUBA divers, surfers and bodyboarders, snorkelers, water skiers, wake boarders, windsurfers, kayakers, jet skiers, and whitewater rafters to allow for comfortable and safe activities in cool or cold water. Wetsuits are essentially a form of thermal apparel that allows for a thin layer of water to form under an insulating material and be warmed by body heat. The insulating material in common use for wetsuits is neoprene, a product of natural rubber. Unfortunately, there are currently more than 25 million adults in the U.S. that have Type I rubber/neoprene allergy, and 15% of the world's population is allergic to neoprene, which is a product of natural rubber. Symptoms of rubber allergy may include skin rash and irritation, itching, hives, blistering of the skin, dermatitis, swelling, tears, difficulty breathing, dizziness, faintness, and nausea. In more severe allergic reactions, symptoms may include shock, low blood pressure, swelling of the throat and constriction of the airways.

The symptoms of rubber allergy are made worse when a garment such as a wetsuit fully covers most of the surface area of the skin. In addition, the symptoms of rubber allergy can become dangerous or deadly when they appear during activities such as SCUBA diving. The current techniques to deal with rubber allergies that occur while wearing wetsuits include the use of spandex rash guards, the application of a plastic wrap (such as SaranWrap®) around the skin, the use of hydrocortisone creams, and other home brewed solutions. Unfortunately, none of these solutions work effectively.

Thus, there exists an unmet need for a wetsuit material that is not based on natural rubber, and does not have the allergen potential of neoprene, which is based on natural rubber.

It is thus an object of the present invention to provide a wetsuit and a wetsuit material that is hypoallergenic. It is another object of the present invention to provide a wetsuit and a wetsuit material that is not based on neoprene. It is another object of the present invention to provide a wetsuit and a wetsuit material that contains hypoallergenic material such as hypoallergenic rubber. It is a further object of the present invention to provide a wetsuit and a wetsuit material that is hypoallergenic and insulates as well or better than neoprene. It is another object of the present invention to provide a wetsuit and a wetsuit material that is hypoallergenic and does not support fungal or bacterial growth. It is yet another object of the present invention to provide a wetsuit and a wetsuit material that is hypoallergenic and withstands tearing, rough handling and severe conditions. It is yet another object of the present invention to provide a wetsuit and a wetsuit material that is hypoallergenic and is inherently flexible. It is yet another object of the present invention to provide a wetsuit and a wetsuit material that is hypoallergenic and is inert to most chemical agents. It is still another object of the present invention to provide a wetsuit and a wetsuit material that is hypoallergenic and is CFC, asbestos, chlorine and fiber-free.

BRIEF SUMMARY OF THE INVENTION

In accordance with the present invention, there is provided a hypoallergenic wetsuit and material comprising closed cell acrylonitrile butadiene rubber.

The foregoing paragraph has been provided by way of introduction, and is not intended to limit the scope of the invention as described in this specification, drawings and claims.

BRIEF DESCRIPTION OF THE DRAWINGS

The invention will be described by reference to the following drawings, in which like numerals refer to like elements, and in which.

Figure 1:
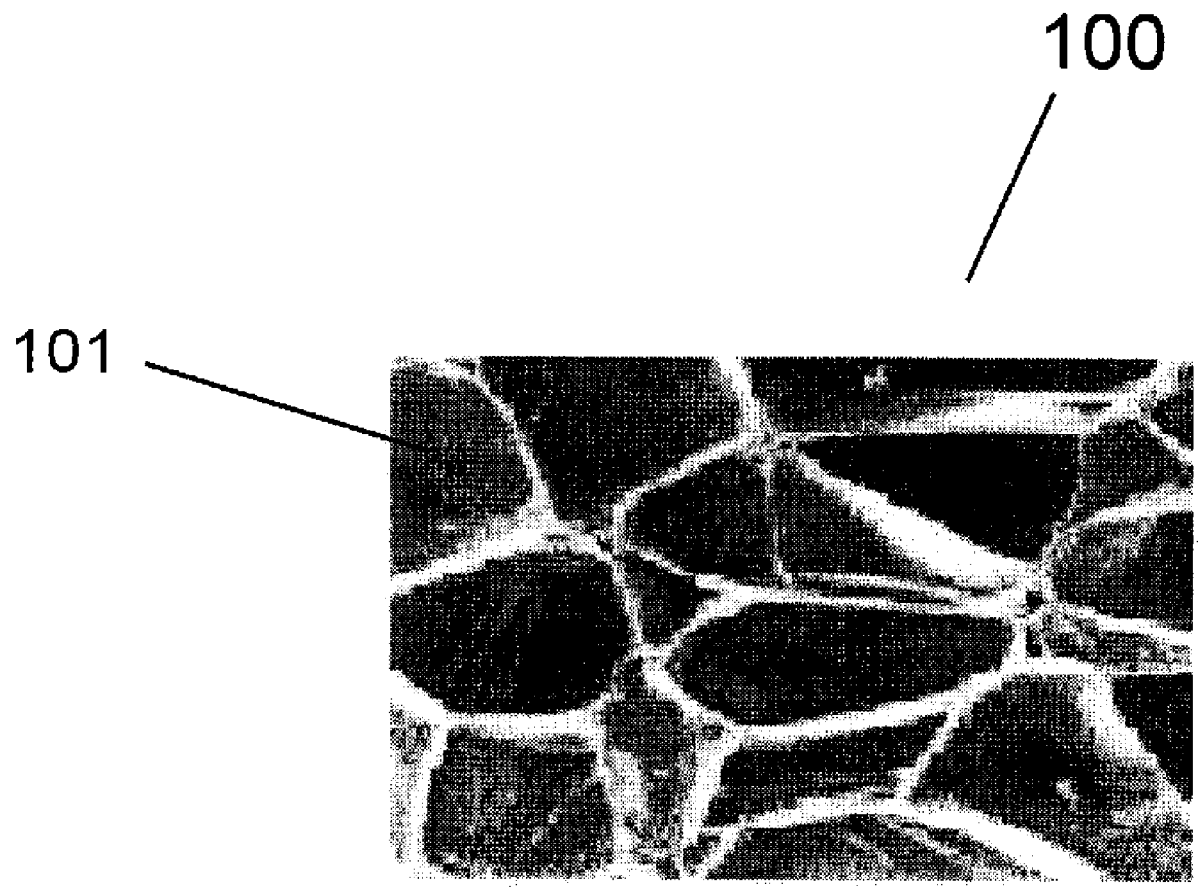
FIG. 1 is a magnified photograph of acrylonitrile butadiene rubber.

The present invention will be described in connection with a preferred embodiment, however, it will be understood that there is no intent to limit the invention to the embodiment described. On the contrary, the intent is to cover all alternatives, modifications, and equivalents as may be included within the spirit and scope of the invention as defined by this specification, drawings and claims.

DESCRIPTION OF THE PREFERRED EMBODIMENTS

Wetsuit fabrication is performed through the use of either automated machine cutting and seam bonding or hand cutting, tailoring and bonding. Both approaches provide for an adequate end product, but hand cutting, tailoring and bonding allows for custom fitting and tailoring. The present invention and the various embodiments depicted herein rely on the use of Acrylonitrile-butadiene rubber (NBR) and its various blends, which can be fabricated into wetsuits using either automated or hand methods, or a combination thereof.

For a general understanding of the present invention, reference is made to the drawings. In the drawings, like reference numerals have been used throughout to designate identical elements.

FIG. 1 is a magnified photograph 100 of closed cell acrylonitrile butadiene rubber. The material depicted in FIG. 1 has a closed cell structure, an example of such a structure is the closed cell 101 depicted in the figure. The closed cell structure of the material of the present invention provides for low thermal conductivity; such a closed cell structure forms an impermeable layer in wetsuit applications, is a good vapor barrier, and is suitable for application within the temperature range of −76 Celsius to +116 Celsius. The material is also ozone and ultraviolet resistant, will not support fungal or bacterial growth, and insulates 10% or better than neoprene. In some embodiments of the present invention, polyvinyl chloride (PVC) is blended with the acrylonitrile butadiene rubber.

Acrylonitrile butadiene rubber (NBR) is a synthetic rubber copolymer of acrylonitrile and butadiene, and is an unsaturated copolymer of 2-propenenitrile and various butadiene monomers (1,2-butadiene and 1,3-butadiene).

In the production of hot acrylonitrile butadiene rubber (NBR), an emulsifier, 2-propenenitrile(acrylonitrile), various butadiene monomers (including e.g., 1,3-butadiene, 1,2-butadiene), radical generating activators and catalysts are added to one or more polymerization vessels. Within the vessels, water is typically the reaction medium. The mixture is heated to 30 celsius to 40 celsius to facilitate the polymerization reaction and to promote branch formation in the polymer. The monomers are permitted to react, and polymerization is allowed to proceed to about 70% conversion before a "shortstop" agent such as dimethyldithioarbamate and/or diethyl hydroxylamine is added to react with the remaining free radicals. After the resulting latex has shortstopped, unreacted monomers are removed by way of steam in a slurry stripper. After recovery of the monomers, the latex is filtered and then stabilized with an antioxidant. The resulting polymer latex is coagulated through the use of calcium chloride, aluminum sulfate, and other coagulating agents. Once this coagulant material is washed and dried, the resulting product is crumb rubber, which may subsequently be further processed into various end products. Cold acrylonitrile butadiene rubber (NBR) is produced in a manner similar to that described, but the polymerization tanks are heated to 5 celsius to 15 celsius. This lower temperature allows for less branching to form on the polymers, making the resulting product vary from that of hot NBR.

In some embodiments of the present invention, polyvinyl chloride (PVC) is blended with the acrylonitrile butadiene rubber (NBR) to achieve desirable physical characteristics of the resulting closed cell material. Blended acrylonitrile butadiene rubber and polyvinyl chloride is hereinafter referred to as NBR-PVC. An example of a process used to make such a blend is that which is disclosed in U.S. Pat. No. 5,834,123 to Laurich et al, entitled Rubbery Polymers With Improved Color Stability", the entire disclosure of which is incorporated herein by reference.

Various densities of acrylonitrile butadiene rubber (NBR), or a blend of NBR and PVC, that has been expanded into a closed cell structure may be used to make the hypoallergenic wetsuit of the present invention. Low densities, for example, less than 70 Kg./m.$^3$, and preferably 50 to 61 Kg./m.$^3$, are well suited for making the hypoallergenic wetsuit of the present invention. Other densities may also be used to make the hypoallergenic wetsuit of the present invention.

Figure 2:
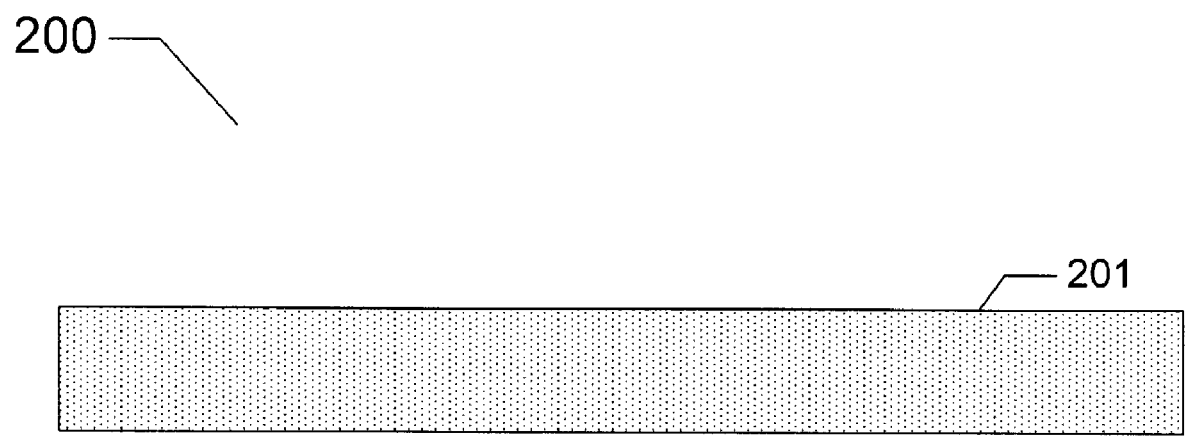
FIG. 2 is a cross sectional diagram of the hypoallergenic wetsuit material.

Turning now to FIG. 2, a cross sectional diagram 200 of the hypoallergenic wetsuit material is shown. In one embodiment of the present invention, the hypoallergenic wetsuit is made from NBR-PVC, 201. The thickness of the material may vary, as does the neoprene in neoprene wetsuits, depending on the specific application where the wetsuit is used. Examples of common material thicknesses include 3 millimeter, 5 millimeter, 7 millimeter, and the like. NBR-PVC may be produced in various colors to further enhance the is desirability of the hypoallergenic wetsuit of the present invention.

Figure 3:
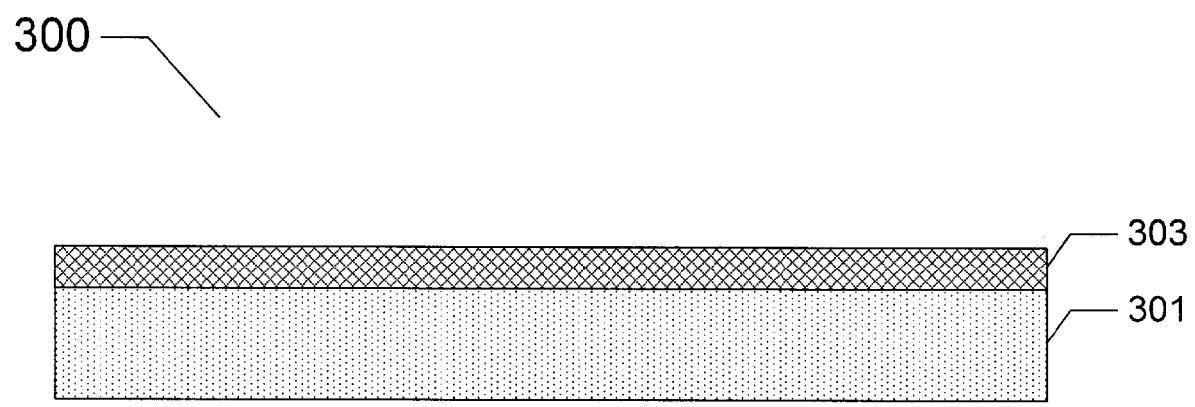
FIG. 3 is a cross sectional diagram of the hypoallergenic wetsuit material with a fabric covering.

Turning now to FIG. 3, in some embodiments of the present invention, a fabric covering 303, as depicted in the cross sectional diagram 300 of the hypoallergenic wetsuit material with a fabric covering, may be used to further strengthen and reinforce the NBR-PVC 301. The fabric covering 303 is bonded to the NBR-PVC 301. using an adhesive, a heat process, a cold process, or the like. Such fabric covering may be a woven polypropylene, a woven nylon, an aramid fiber such as a woven KEVLAR®, LYCRA®, spandex, or the like. In some embodiments of the present invention, the fabric covering 303 may be a jersey with a titanium coating, or the like.

Figure 4:
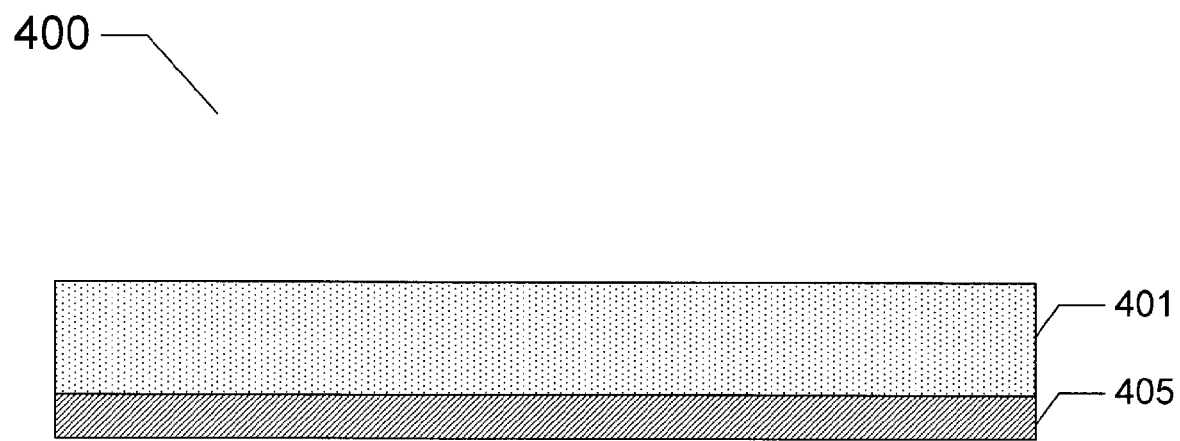
FIG. 4 is a cross sectional diagram of the hypoallergenic wetsuit material with an inner liner.

Turning now to FIG. 4, in some embodiments of the present invention, an inner liner 405, as depicted in the cross sectional diagram 400 of the hypoallergenic wetsuit material with an inner liner, may he used to provide added comfort to the user. The inner liner is bonded to the NBR-PVC 401 using an adhesive, a heat process, a cold process, or the like. Such inner liner may be a fleece polypropylene. a spun nylon, a jersey. a titanium coated jersey, a low friction coating such as an SCS coating, LYCRA®, spandex, or the like.

Figure 5:
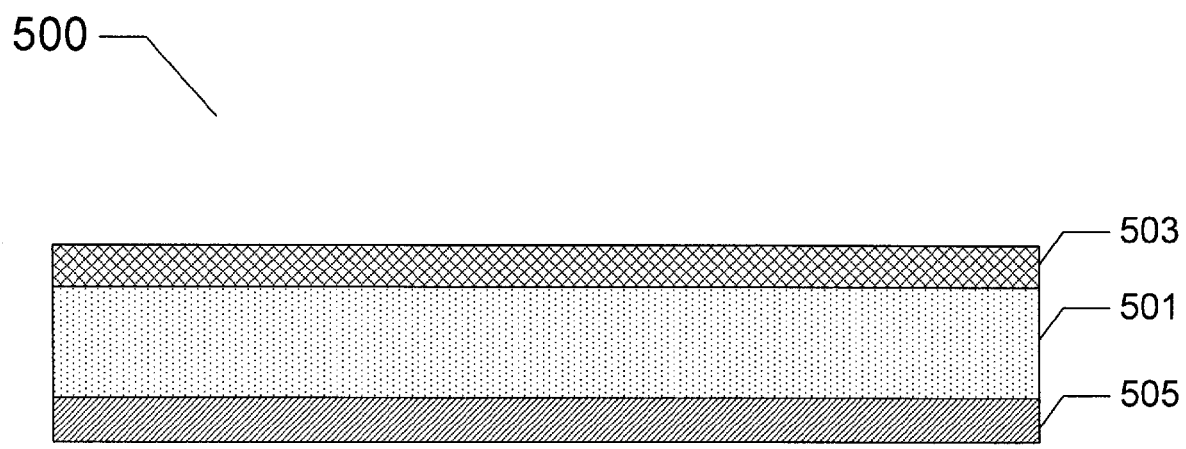
FIG. 5 is a cross sectional diagram of the hypoallergenic wetsuit material with a fabric covering and an inner liner.

Now turning to FIG. 5, in some embodiments of the present invention, an inner liner 505 and a fabric covering 503 may be applied to the NBR-PVC 501 as shown in FIG. 5, which is a cross sectional diagram 500 of the hypoallergenic wetsuit material with a fabric covering and an inner liner. The inner liner 505 is bonded to the NBR-PVC 501 using an adhesive, a heat process, a cold process, or the like. Such inner liner may be a fleece polypropylene, a spun nylon, a jersey, a titanium coated jersey, a low friction coating such as an SCS coating. Lycra®, spandex, or the like. In a similar fashion, the fabric covering 503 is bonded to the NBR-PVC 501 using an adhesive, a heat process, a cold process, or the like. The fabric covering 503 may be a woven polypropylene, a woven nylon, an aramid fiber such as a woven KEVLAR®. LYCRA®, spandex, or the like. In some embodiments of the present invention, the fabric covering 503 may be a jersey with a titanium coating. or the like.

In some embodiments of the present invention, other materials may be placed on either side of the NBR-PVC 501 to enhance performance or achieve desirable characteristics of the hypoallergenic wetsuit.

To make a hypoallergenic wetsuit of the present invention, techniques such as those known to those skilled in the art in the field of neoprene wetsuit fabrication and tailoring, are employed. For example, the acrylonitrile butadiene rubber material is cut to various patterned pieces, the pieces are joined together using a technique such as gluing or double gluing (glue is applied to both sides of each piece of material to be joined together), the joined and glued together pieces may optionally be nipped (a technique where pressure is applied to the joined seams), a piece of material such as heat welded tape made from a material such as stretch nylon is then placed on the inside of the scam and glued in place, the pieces are then blind stitched from one or both sides, and optionally the seams are covered with a material such as heat welded tape or the like. To complete the hypoallergenic wetsuit, a zipper or zippers are added along with decals, accessories, and the like. As known to those skilled in the art, the steps heretofore described may be modified or adapted to various situations, materials, and wetsuit designs.

Figure 6:
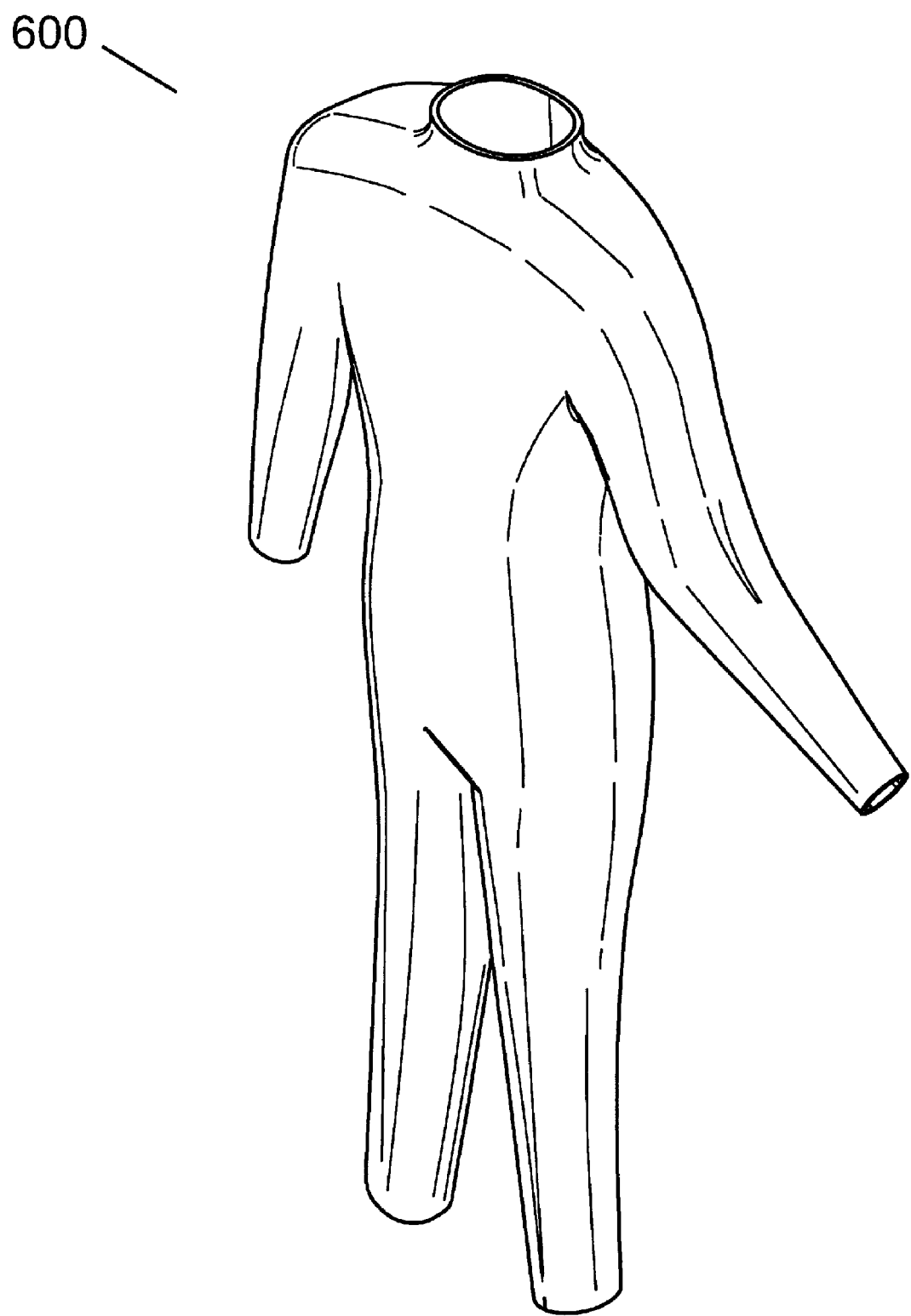
FIG. 6 is the hypoallergenic wetsuit of the present invention in a mens full suit.
Figure 7:
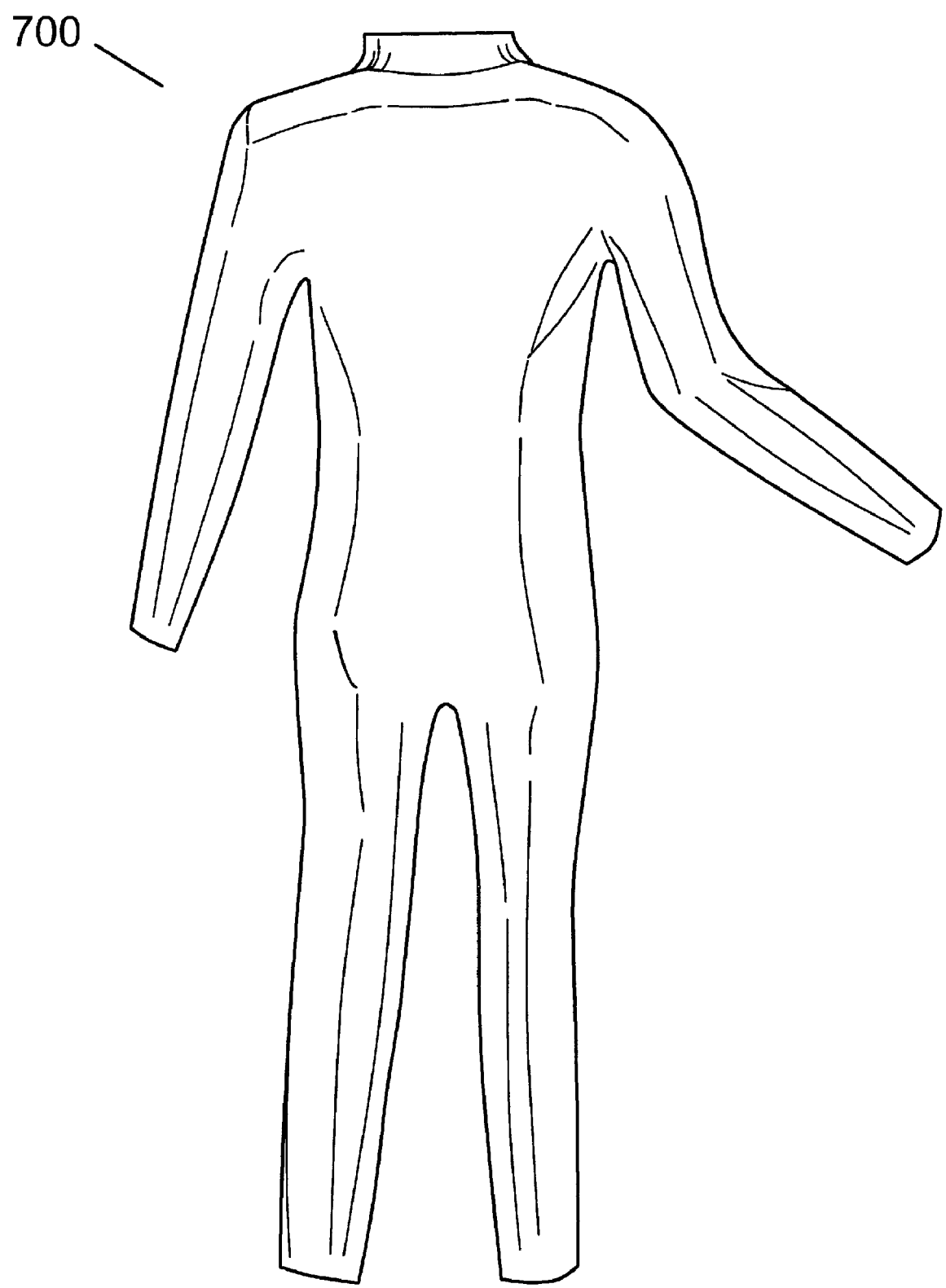
FIG. 7 is the hypoallergenic wetsuit of the present invention in a womens full suit.
Figure 8:
FIG. 8 is the hypoallergenic wetsuit of the present invention in a mens farmer john.
Figure 9:
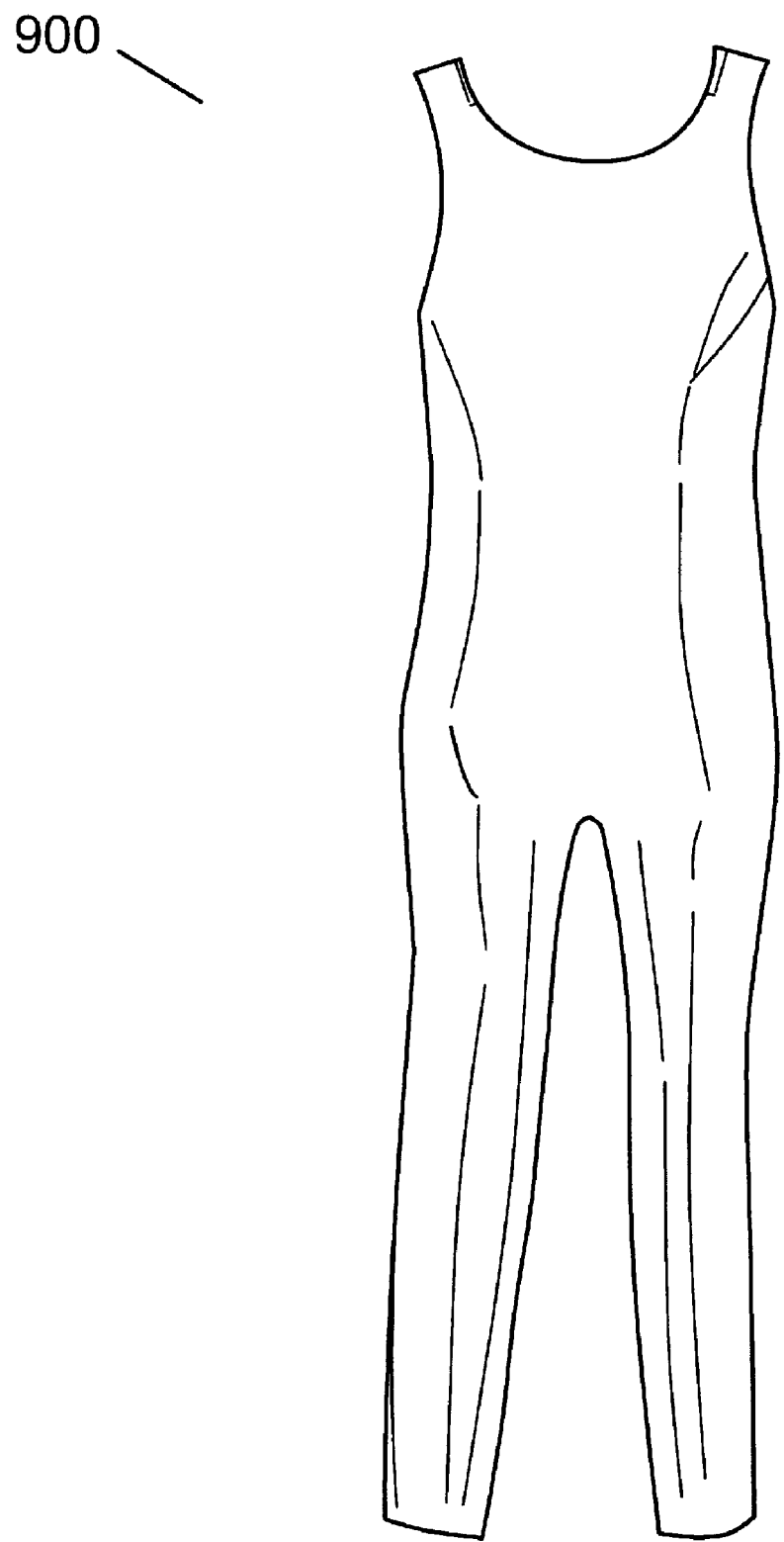
FIG. 9 is the hypoallergenic wetsuit of the present invention in a womens farmer jane.
Figure 10:
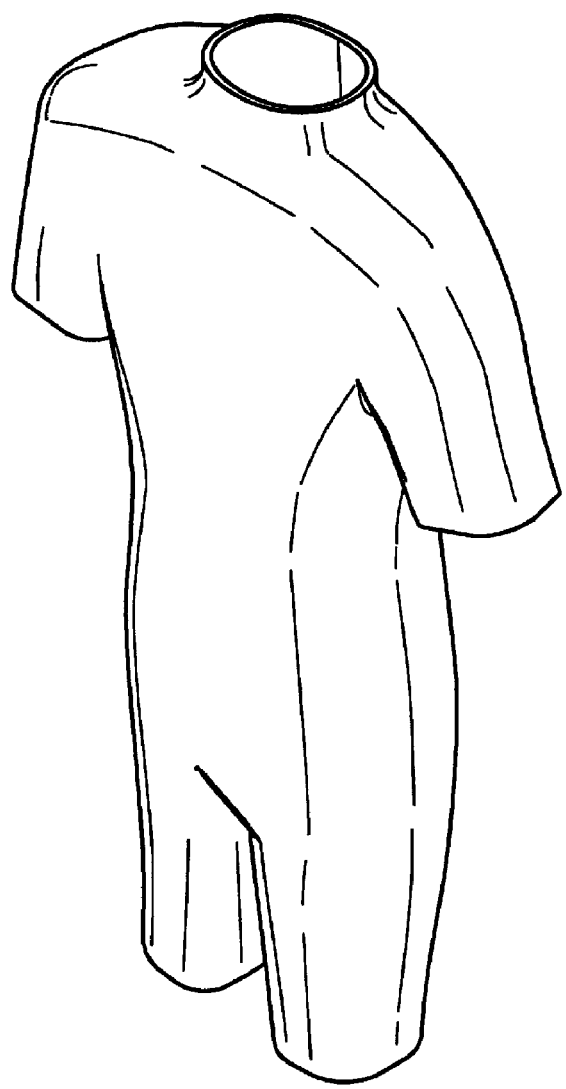
FIG. 10 is the hypoallergenic wetsuit of the present invention in a mens shorty.
Figure 11:
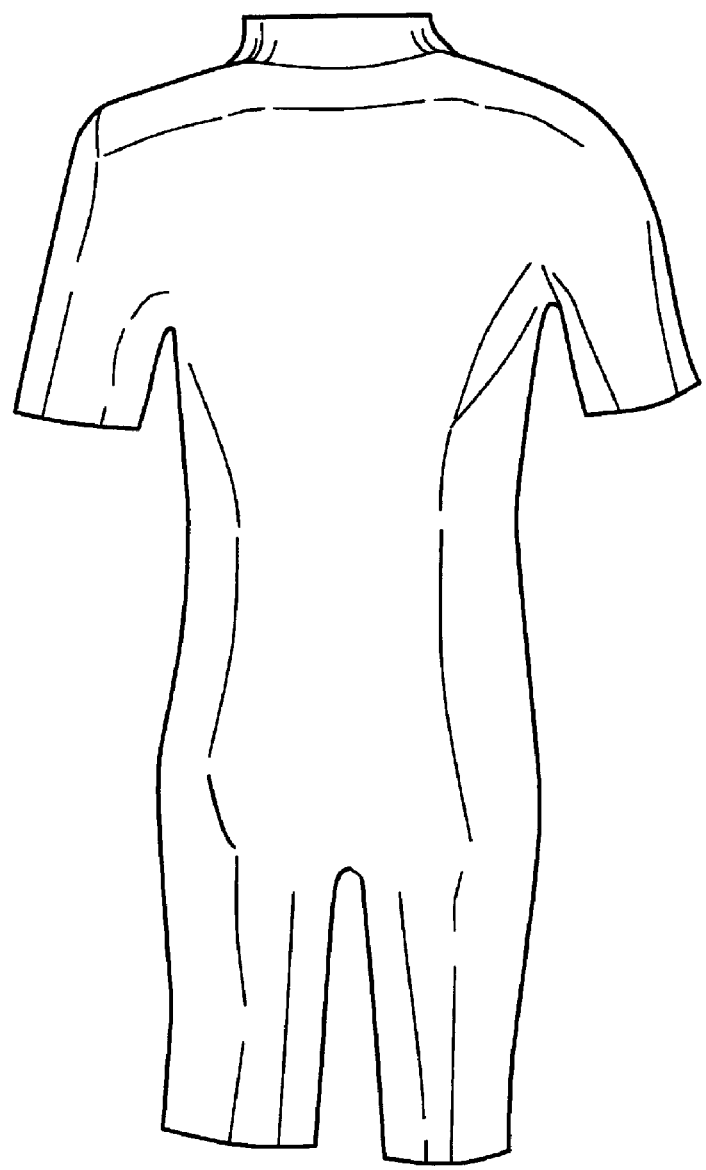
FIG. 11 is the hypoallergenic wetsuit of the present invention in a womens shorty.

The resulting hypoallergenic wetsuit may be of any style and size desired. Some examples of hypoallergenic wetsuits are depicted in FIGS. 6-11. Variations and modifications to the hypoallergenic wetsuit of the present invention will be known to those skilled in the art. Those examples depicted in FIGS. 6-11 are shown by example only, and are not intended to be limiting. FIG. 6 is a hypoallergenic wetsuit of the present invention in a men's full suit 600. FIG. 7 is a hypoallergenic wetsuit of the present invention in a women's full suit 700. FIG. 8 is a hypoallergenic wetsuit of the present invention in a men's farmer john 800. FIG. 9 is a hypoallergenic wetsuit of the present invention in a women's farmer jane 900. FIG. 10 is a hypoallergenic wetsuit of the present invention in a men's shorty 1000; and FIG. 11 is a hypoallergenic wetsuit of the present invention in a women's shorty 1100.

It is, therefore, apparent that there has been provided, in accordance with the various objects of the present inventions a hypoallergenic wetsuit and material. While the various objects of this invention have been described in conjunction with preferred embodiments thereof, it is evident that many alternatives, modifications, and variations will be apparent to those skilled in the art. Accordingly, it is intended to embrace all such alternatives, modifications and variations that fall within the spirit and broad scope of this specification, drawings, and claims.

I claim:

1. A wetsuit comprising cut patterned pieces of hypoallergenic closed cell acrylonitrile butadiene rubber material;
   wherein the hypoallergenic closed cell acrylonitrile butadiene rubber material has a low density of less than about 70 kilograms per cubic meter; and
   wherein the cut patterned pieces of hypoallergenic closed cell acrylonitrile butadiene rubber material have a thickness in the range of about 3 millimeters to about 7 millimeters.

2. The hypoallergenic wetsuit of claim 1, further comprising an outer fabric covering.

3. The hypoallergenic wetsuit of claim 2, wherein the outer fabric covering is spandex.

4. The hypoallergenic wetsuit of claim 2, wherein the outer fabric covering is woven polypropylene.

5. The hypoallergenic wetsuit of claim 2, wherein the outer fabric covering is woven nylon.

6. The hypoallergenic wetsuit of claim 2, wherein the outer fabric covering is aramid fiber.

7. The hypoallergenic wetsuit of claim 1, further comprising an inner liner.

8. The hypoallergenic wetsuit of claim 7, wherein the inner liner is fleece polypropylene.

9. The hypoallergenic wetsuit of claim 7, wherein the inner liner is spun nylon.

10. A material for a wetsuit comprising hypoallergenic closed cell acrylonitrile butadiene rubber material and an outer fabric covering;
    wherein the hypoallergenic closed cell acrylonitrile butadiene rubber material has a low density of less than about 70 kilograms per cubic meter; and
    wherein the material has a thickness in the range of about 3 millimeters to about 7 millimeters.

11. The hypoallergenic material of claim 10, wherein the outer fabric covering is spandex.

12. The hypoallergenic material of claim 10, wherein the outer fabric covering is woven polypropylene.

13. The hypoallergenic material of claim 10, wherein the outer fabric covering is woven nylon.

14. The hypoallergenic material of claim 10, wherein the outer fabric covering is aramid fiber.

15. The hypoallergenic material of claim 10, further comprising an inner liner.

16. The hypoallergenic material of claim 15, wherein the inner liner is fleece polypropylene.

17. The hypoallergenic material of claim 15, wherein the inner liner is spun nylon.

18. A process for the manufacture of a wetsuit, the process comprising the steps of:
    cutting patterned pieces of hypoallergenic closed cell acrylonitrile butadiene rubber material;
    joining the patterned pieces of hypoallergenic closed cell acrylonitrile butadiene rubber material with an adhesive;
    stitching the patterned pieces of hypoallergenic closed cell acrylonitrile butadiene rubber material with seams; and
    taping the resulting seams.

* * * * *